US011681978B2

(12) United States Patent
Krimon et al.

(10) Patent No.: US 11,681,978 B2
(45) Date of Patent: Jun. 20, 2023

(54) INVENTORY CAPTURE SYSTEM

(71) Applicant: Intel Corporation, Santa Clara, CA (US)

(72) Inventors: Yuri I. Krimon, Folsom, CA (US); David I. Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 16/872,782

(22) Filed: May 12, 2020

(65) Prior Publication Data
US 2021/0064939 A1    Mar. 4, 2021

Related U.S. Application Data

(63) Continuation of application No. 15/197,432, filed on Jun. 29, 2016, now Pat. No. 10,650,281.

(51) Int. Cl.
| | | |
|---|---|---|
| *G06K 9/00* | (2022.01) | |
| *G06Q 10/087* | (2023.01) | |
| *G06V 20/52* | (2022.01) | |
| *G06V 40/10* | (2022.01) | |
| *G06F 18/24* | (2023.01) | |
| *G06F 18/22* | (2023.01) | |

(52) U.S. Cl.
CPC ........... *G06Q 10/087* (2013.01); *G06F 18/22* (2023.01); *G06F 18/24* (2023.01); *G06V 20/52* (2022.01); *G06V 40/103* (2022.01)

(58) Field of Classification Search
CPC ...... G06K 9/6215; G06K 9/6267; G06K 9/00; G06Q 10/087; G06T 2207/30124; G06T 7/0014
See application file for complete search history.

(56) References Cited

U.S. PATENT DOCUMENTS

| | | | |
|---|---|---|---|
| 10,650,281 B2 | 5/2020 | Krimon et al. | |
| 2013/0083999 A1 | 4/2013 | Bhardwaj et al. | |
| 2013/0085893 A1* | 4/2013 | Bhardwaj | G06F 16/24578 705/26.62 |
| 2013/0138503 A1* | 5/2013 | Brown | G06Q 30/0203 705/14.45 |
| 2014/0035913 A1 | 2/2014 | Higgins et al. | |
| 2014/0310304 A1 | 10/2014 | Bhardwaj et al. | |

(Continued)

OTHER PUBLICATIONS

United States Patent and Trademark Office, "Notice of Allowance and Fee(s) Due," Issued in connection with U.S. Appl. No. 15/197,432, dated Jan. 13, 2020, 8 pages.

(Continued)

*Primary Examiner* — Tom Y Lu
(74) *Attorney, Agent, or Firm* — Hanley, Flight & Zimmerman, LLC

(57) ABSTRACT

The inventory capture system, method and apparatus (i.e., the inventory capture system) may provide for creating and updating an inventory of clothing for a user. The inventory capture system may use voice and image recognition to capture an inventory of clothing and provide users the ability to enhance the captured details about an inventory of clothing with annotations. Moreover, the inventory capture system may provide a way to facilitate retailers and users to leverage the user's existing inventory of clothing and augment the user's inventory of clothing with shared, purchased and/or rented clothing.

23 Claims, 7 Drawing Sheets

(56) References Cited

U.S. PATENT DOCUMENTS

| | | | | |
|---|---|---|---|---|
| 2016/0063588 A1* | 3/2016 | Gadre | ................ | G06Q 30/0643 |
| | | | | 705/26.61 |
| 2016/0189274 A1* | 6/2016 | MacLaurin | ........ | G06Q 30/0631 |
| | | | | 705/26.7 |
| 2018/0144387 A1* | 5/2018 | Miller | ................ | G06Q 30/0629 |
| 2020/0061839 A1* | 2/2020 | Deyle | ................. | G06Q 10/087 |

OTHER PUBLICATIONS

United States Patent and Trademark Office, "Non Final Office Action," Issued in connection with U.S. Appl. No. 15/197,432, dated Aug. 28, 2019, 10 pages.

\* cited by examiner

| User Id | Inv. Id | Category | Title | Color | Material | Pattern | Size | Size Type | Brand | Image | Annotation | Description | Smell |
|---|---|---|---|---|---|---|---|---|---|---|---|---|---|
| 999003 | 1 | D275 | Dress | Red | Cotton | Solid | 8 | M | G4 | ... | Rec592 | Casual Dress | Cotton |
| 999003 | 4 | D275 | Dress | Blue | Cotton | Plaid | 8 | M | NY3 | ... | Rec469 | Casual Dress | Sea Salt |
| ... | | | | | | | | | | | | | |
| 544488 | 857 | D381 | Shirt | Pink | Silk | Digital | 17 | XL | Z2U | ... | Rec727 | Button Down | Strawberry |

INVENTORY CAPTURE SYSTEM

RELATED APPLICATION

This patent arises from a continuation of U.S. patent application Ser. No. 15/197,432, filed Jun. 29, 2016, entitled "INVENTORY CAPTURE SYSTEM." U.S. patent application Ser. No. 15/197,432 is hereby incorporated by reference in its entirety. Priority to U.S. patent application Ser. No. 15/197,432 is hereby claimed.

TECHNICAL FIELD

Embodiments generally relate to capturing items of an inventory. More particularly, embodiments relate to voice and image recognition that facilitates inventory capture systems.

BACKGROUND

Fashion and clothing retailers may collect the order histories of customers and use the collected histories to make recommendations for subsequent rentals and/or purchases. Knowledge of the clothing that a customer already owns, however, may be difficult for a retailer to obtain. For example, a customer's inventory of clothing may include items acquired from previous time periods and/or other sources. As a result, conventional recommendations may be suboptimal from the perspective of the customer.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a block diagram of an example of an inventory capture database according to an embodiment;

DETAILED DESCRIPTION

In order to make better and more insightful recommendations (e.g., clothing and/or accessory purchase/sale recommendations), retailers may attempt various ways to assist the user/customer in acquiring the current inventory of clothing and/or accessories of the customer. Manually entering clothing inventory details (e.g., using a keyboard) may deter customers from completing the inventory, because of the difficulty and/or time required for the customer to describe the clothing in sufficient detail. Indeed, the customer may lack the facility (e.g., color blindness and/or vocabulary) to accurately describe an appropriate shade of a green shirt. As another example, accurately describing a sweater may include articulating color, patterns, type of fabric/material, weave tightness, etc., which may be difficult, time consuming and/or undesirable from the perspective of a typical consumer.

Figure 1:
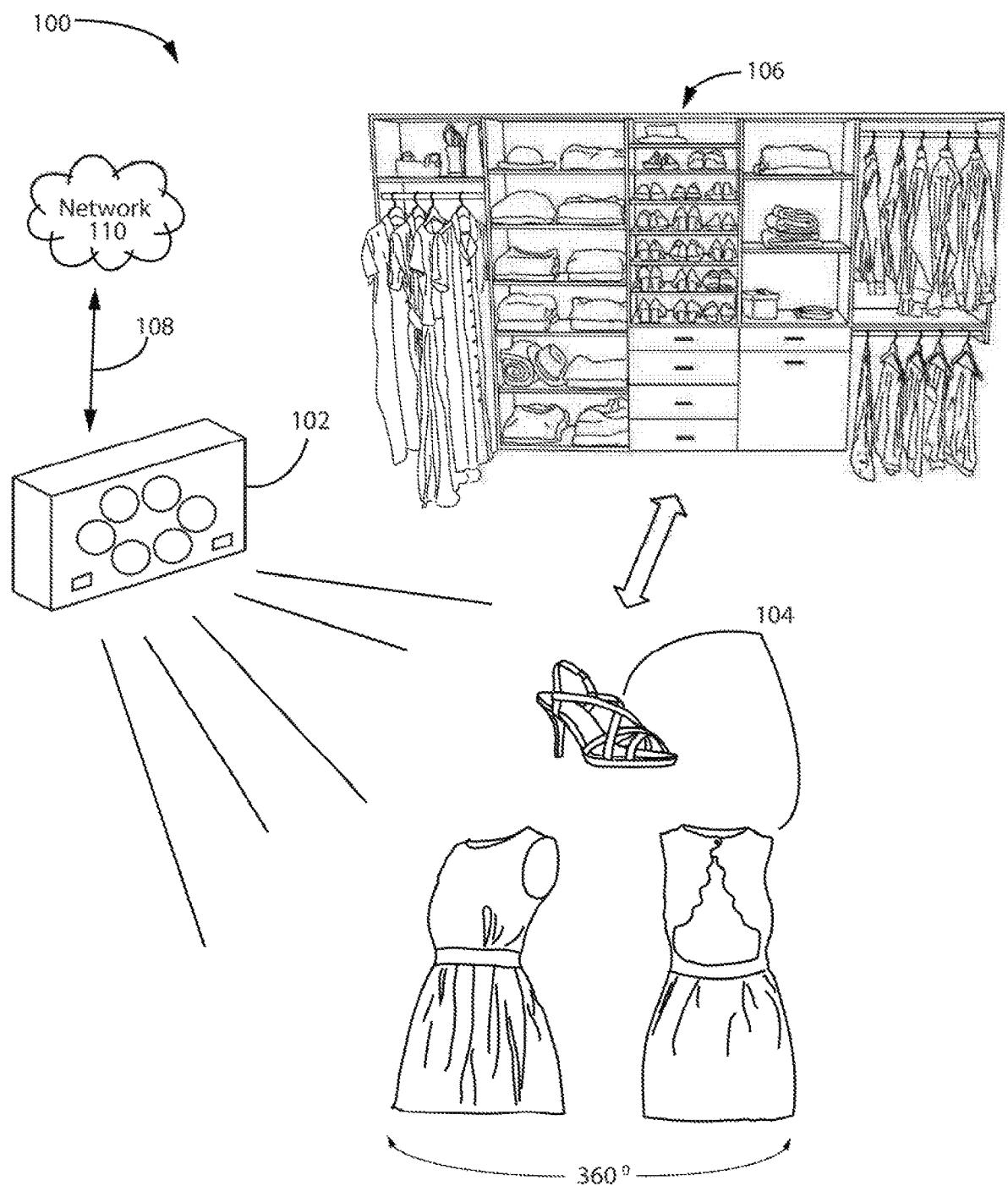
FIG. 1 is a diagram of an example of a clothing inventory capture according to an embodiment.

Turning now to FIG. 1, diagram 100 illustrates an example of a clothing inventory capture according to an embodiment. In the illustrated example, a user (e.g., customer, not shown) may interact with an inventory capture system 102 to capture (e.g., record) items of clothing 104 from the user's closet 106 (e.g., wardrobe). The inventory capture system 102 may prompt the user to capture each item of clothing 104 with multiple images (e.g., images recording 360° views and/or front and back images of the clothing). The inventory capture system 102 may communicate via one or more wireless signals 108 with a network 100 (e.g., Internet) to facilitate user inventory analysis and the generation of recommendations regarding clothing and other fashion-related items. The recommendations may be for the user to, for example, share, rent or purchase certain items that are not currently in the user inventor and may be of interest to the user. The inventory capture system 102 may also access the user's calendar to identify anticipated events, analyze inventory and prompt the user to complete the inventory capture to determine whether the user's inventory provides options to satisfy the event (e.g., acceptable/appropriate clothing for the event) and/or make recommendations regarding items of clothing to rent/purchase. The user may, for example, view the captured inventory and review recommendations via a mobile device, and recommendations may be delivered to the user's calendar to view simultaneously with upcoming events and activities.

The inventory capture system 102 may include a camera enabled mobile phone, tablet, and/or a special purpose device with an inventory capture application. The system 102 may be provided (e.g., lent, rented, or sold) to the customer by, for example, the retailer in order to complete the customer's inventory. In one example, the customer carries the system 102 through the customer's closet(s) and drawers and/or anywhere else the customer's clothing may be located to capture one or multiple recordings. The recordings may include the capture of visual images as well as infrared and/or ultraviolet spectrum images and/or metadata regarding each item of clothing 104 in the inventory. The inventory capture system 102 may also include audio capabilities to instruct the customer to capture a 360° view and/or particular aspects of the clothing for a more complete detailed description of the clothing. In addition to clothing, the inventory capture system 102 may capture personal articles worn and/or used by the customer (e.g., gloves, glasses, hats, umbrellas, shoes, boot, as well as lifestyle personal property such as cars, boats, hobby property).

The inventory capture system 102 may include an imaging device (e.g., two-dimensional/2D camera, three-dimensional/3D camera, stereoscopic cameras) and/or subsystem with sensor capabilities in non-visual frequency bands (e.g., infrared/IR spectrum and ultraviolet/UV spectrum). As will be discussed in greater detail, the inventory capture system 102 may use a camera with features such as a full-high definition/HD camera with depth sensing capabilities to create an image that enables a user to execute 3D scanning and selective filters to capture the clothing inventory. The user may also take a photograph and/or select an image online of a piece of clothing and indicate a level of interest in the item, wherein the inventory capture system 102 may communicate recommendations to the user accordingly.

The inventory capture system 102 may also facilitate performing non-directed capture of the customer's inventory of clothing over time by capturing what the customer is wearing when the customer is in front of a computer webcam (e.g., desktop computer, tablet) and/or camera enabled mobile device and/or other devices configured with the inventory capture system logic (e.g., a webcam and/or closed-circuit television/CCTV) digital camera located in an interior and/or exterior location). The non-directed capture may take a longer period of time than a directed purposeful inventory capture where the customer dedicates a period of time (e.g., an hour or afternoon) to record the inventory. Customer's may use the inventory capture system 102 to capture the inventory of clothing regularly, in anticipation of a particular event and/or lifestyle changes (e.g., wedding, trip, job interview, pregnancy, diet) and/or seasonally (e.g., before and/or at the end of winter, spring, summer, fall).

The inventory capture system 102 may also offer a catalogue of clothing (e.g., reference clothing) presented in a graphical interface to the customer to view to confirm items in the customer's inventory of clothing so that the customer may minimize the length of time to capture the customer's inventory of clothing (e.g., wardrobe).

The inventory capture system 102 may be used for clothing, fashion and lifestyle preferences, as well as household items (e.g., capturing the aesthetic attributes of such items as furniture identified by aesthetic attributes such as leather, fabric, color, a pattern, a shape or a weave tightness, wood or other properties, household furnishings, as well as lifestyle personal property including makeup, jewelry, watches, shoes, boots, belts, bags, hats, scarfs, glasses, mobile device covers and accessories, cars, boats, motorcycles).

The inventory capture system 102 may also be used by users who may have a preferred makeup style and use the system 102 to capture makeup preferences (e.g., capturing the user with preferred makeup on and/or makeup containers) with the inventory of clothing, in order to make recommendations of clothing and accessories as well as makeup that compliment. The user may interact with the inventory capture system 102 to include a recorded audio comment about the makeup captured at a particular time or instance to indicate a rating (e.g., the user may indicate the user's makeup gives the user a great look today or the look could be better).

The inventory capture system 102 may be embedded in a mirror (e.g., in the frame, behind a two-way mirror) located in a dressing area or makeup area, or may be located in a clothes closet 106 that captures (e.g., autonomously) items placed in or retrieved from the clothes closet 106. The inventory capture system 102 may be deployed in camera and/or embedded in a mobile device (e.g., smart phone), a mirror or hung on a closet door, a robot and/or an autonomous device that performs the inventory capture, a free standing device mounted in a drycleaner store to capture the customers clothing, and/or a clothes washer to capture the clothing placed in the washer.

The inventory capture system 102 may therefore provide a way to complete an inventory of a customer's clothing and fashion related accessories (e.g., shoes, coats, belts, jewelry, etc.) using voice and image recognition with multiple inputs (e.g., various sensors such as IR, UV, and stereo imaging, configured in an enhanced camera with audio capture/recording capabilities embedded with logic such as RealSense™). The illustrated inventory capture system 102 captures the details about the clothing, recognizes the details and metadata about the clothing (e.g., material composition, fabric, pattern, color, shape, texture, smell) and uses the information to automatically create and maintain a clothing inventory for the customer.

Figure 2:
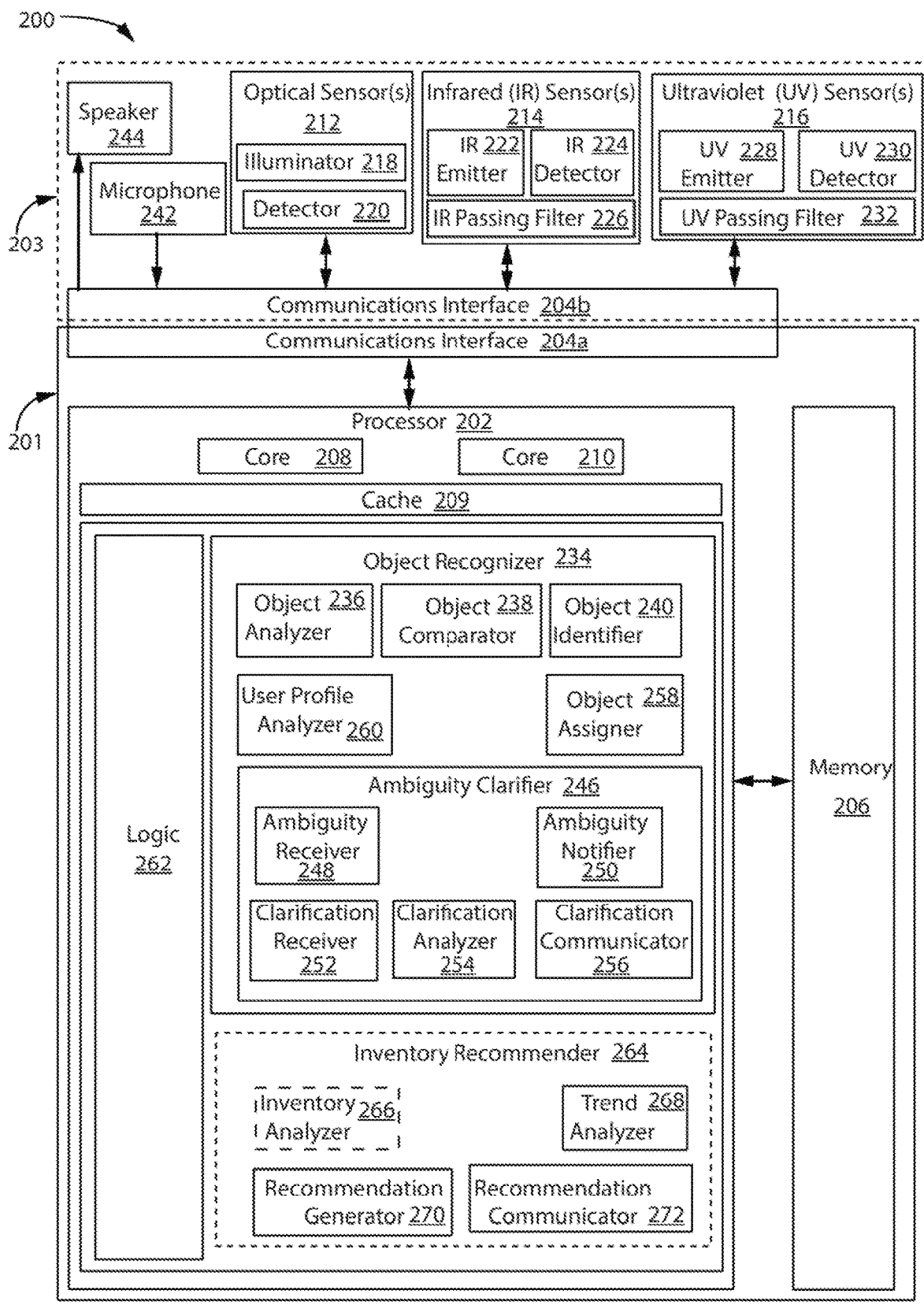
FIG. 2 is a block diagram of an inventory capture system according to an embodiment.

FIG. 2 illustrates a block diagram of an inventory capture system 200 according to an embodiment. The inventory capture system 200, which may be readily substituted for the system 102 (FIG. 1), already discussed, may include a system server 201 and a client device 203. Alternatively, the inventory capture system 200 may include the system server 201 separately, and communicate with the client device 203 through a communications interface 204a, 204b. The system server 201 may include a processor 202, a communications interface 204a and memory 206 coupled to the processor 202. The memory 206 may be external to the processor 202 (e.g., external memory), and/or may be coupled to the processor 202 by, for example, a memory bus. In addition, the memory 206 may be implemented as main memory. The memory 206 may include, for example, volatile memory, non-volatile memory, and so on, or combinations thereof. For example, the memory 206 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 206 may include an array of memory cells arranged in rows and columns, partitioned into independently addressable storage locations.

The system server 201 may include cores 208, 210 that may execute one or more instructions such as a read instruction, a write instruction, an erase instruction, a move instruction, an arithmetic instruction, a control instruction, and so on, or combinations thereof. The cores 208, 210 may, for example, execute one or more instructions to move data (e.g., program data, operation code, operand, etc.) between a cache 209 or a register (not shown) and the memory 206, to read the data from the memory 206, to write the data to the memory 206, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The client device 203 may include a stereoscopic device (e.g., camera) with two or more lenses with one or more sensors that simulate human binocular vision and provide the ability to capture three-dimensional images. The client device 203 may also include one or more monoscopic devices and multiscopic devices that monoscopically and/or multiscopically record/capture a monoscopic capture event and a multiscopic capture event. The client device 203 may include one or more sensors such as optical sensor(s) 212 for the visible spectrum, infrared (IR) sensor(s) 214 and/or ultraviolet (UV) sensor(s) 216 to generate one or more recordings of one or more fashion-related items (e.g., clothing items), and the recording(s) may be stored in the memory 206. The optical sensor(s) 212 may be configured with an optical illuminator 218 (e.g., flash) and detector 220 to capture an image (e.g., of an item of clothing). The IR sensor(s) 214 may be configured with an IR emitter 222, an IR detector 224 and an IR passing filter 226 that may sense near-infrared and/or far-infrared spectrums that allows infrared (IR) light pass through to the infrared sensor(s), but may block all or most of the visible light spectrum. The ultraviolet sensor(s) 214 may be configured with a UV emitter 228 (e.g., emitting lamp), UV detector 230 and a UV passing filter 232 (e.g., transmitting filter) that allows UV light to pass to the UV sensor(s) 216 and absorbs or blocks visible and infrared light for the UV sensor. The client device 203 may include one or more filters to narrow the illuminant waveband (e.g., an exciter filter) that allows a particular radiation (e.g., spectrum) to pass to induce a particular fluorescence. The ultraviolet sensor(s) 216 may provide information regarding the types of dyes used in the fabric and/or material, and the cleanliness of the clothing. The sensors 212, 214 and 216 may identify areas of the clothing that include a spot or blotch that may indicate a need to address the area of the clothing with cleaning or a treatment. The sensors 212, 214 and 216 may identify whether an article of clothing is ideal for particular conditions and/or use (e.g., winter coat, sun blocking fabric, garments suited for hot temperatures).

The optical sensor(s) 212, the optical illuminator 218, the detector 220, the IR sensor(s) 214, the IR emitter 222, the IR detector 224, the IR passing filter 226, the UV sensor(s) 216, the UV emitter 228, the UV detector 230 and the UV passing filter 232 may be included in the client device 203 (e.g., a camera, a mobile device) in communications with the inventory capture system 200 and/or the system server 201 through the communications interface 204a, 204b.

The system server 201 may also include an object recognizer 234 to identify whether recordings of each item of clothing captured (e.g., scanned) match one or more reference objects (e.g., fashion-related reference items). The object recognizer 234 may include an analyzer 236 to analyze the recording to determine one or more aesthetic attributes of the item of clothing. The object recognizer 234 may include a comparator 238 to compare the recording with one or more reference objects (e.g., fashion-related reference items), and an identifier 240 to identify the recording based on the object recognizer comparison and the object recognizer analysis.

The client device 203 may include a microphone 242 and a speaker 244 coupled to the communication interface 204a, 204b to allow the user to interact with the inventory capture system 200. The system server 201 and/or the client device 203 may include voice recognition to process and analyze audio received through the microphone 242. The speaker 244 and microphone 242 may enable the customer (e.g., user) to submit additional information about the clothing (e.g., preference annotations that the user expresses for an item of clothing, comments about whether the customer would like the item in another color, fabric, material or some other aesthetic attribute preference).

The annotation capabilities of the inventory capture system 200 may allow the user to describe a feeling and/or impression the user wants to convey. For example, the user may have an important presentation and wants attire that will help exude an impression of professionalism, confidence, and yet, make the user look cool. In another example, the user may indicate that the user's significant other finds the user's wardrobe dated and makes the user look older such that the user desires clothes that will make the user look younger and that user's significant other may like. The inventory capture system 200 may also enable multiple users' inventories to be linked (e.g., friends and significant others) to identify clothing recommendations that appeal and/or compliment the users, and such linking may be used to facilitate sharing and/or renting clothing between/among users.

The speaker 244 and microphone 242 may be used to clarify ambiguities (e.g., the device may prompt the user to clarify an attribute (e.g., aesthetic attribute) that the device finds ambiguous such as distinguishing between rayon and silk fabric). The speaker 244 and microphone 242 may also be used to prompt the user to confirm whether a clothing item is a duplicate or being mistakenly captured more than once by the inventory capture system 200. The speaker 244 and microphone 242 may be included in the client device 203 (e.g., a camera, a mobile device) in communications with the inventory capture system 200 and/or the system server 201 through the communications interface 204a, 204b.

The system server 201 may also include an object ambiguity clarifier 246 that includes an ambiguity receiver 248 to receive, through the communication interface 204, an ambiguity clarification request from the object recognizer object comparator 238 for the recording identified as matching multiple (e.g., one or more potential matches) reference objects. The object ambiguity clarifier 246 may include an ambiguity notifier 250 to construct and communicate a clarifying question through the speaker 244 based on the multiple reference objects. The ambiguity clarifier 246 may send details (extracted camera images and/or other recorded details) to an additional processor and/or service for additional analysis (e.g., and real time reply/response). The ambiguity notifier 250 may construct the clarifying question using natural language processing/NLP. The object ambiguity clarifier 246 may include a clarification receiver 252 to receive a clarifying question response through the microphone 242, and a clarification analyzer 254 to analyze the clarifying question response. The object ambiguity clarifier 246 may include a clarification communicator 256 to communicate a clarification to the object recognizer comparator 238 based on the clarification analysis so that the object recognizer identifier 240 may further identify the recording as one of multiple reference objects.

The object recognizer 234 may further include an object assigner 258 to receive through the communication interface 204a, 204b the identification of the recording, and assign the clothing item an inventory identifier (e.g., value) to create and/or update a user's clothing inventory data for the inventory capture system 200. The object recognizer 234 may further include a user profile analyzer 260 that analyzes the user's preferences (e.g., categories of clothing identified, such as sportswear, high fashion, business casual) based on the items of clothing captured and processed (e.g., assigned an inventory identifier and added to the user's captured inventory). The user profile analyzer 260 may also access a user's social media and/or calendar to identity lifestyle activities (e.g., vacationing, bike riding, scuba diving, dinner out) and events (e.g., job interviews, weddings, gradations, presentations) a user may have attended and/or anticipates attending.

The system server 201 may include logic 262 to coordinate processing among the various components and/or subsystems of the inventory capture system 200 to capture the items of clothing. The system server 201 may further include an inventory recommender 264 that includes an inventory analyzer 266 to analyze a user's inventory of captured clothing by reviewing the categories of clothing, the user's profile, and fashion trends identified by a trend analyzer 268. Although the system server 201, as illustrated in FIG. 2, is shown to include the inventory recommender 264, the inventory recommender 264 may be included in another device and/or other system in communication with the system server 201 through the communications interface 204a, 204b. The trend analyzer 268 may analyze global, national and local fashion trends, as well as the user's personal fashion trends (e.g., historical seasonal and general purchases, events and activities) to identify gaps in the user's inventory of clothing as well as clothing in the user's inventory matching particular fashion trends. The trend analyzer 268 may extract attributes (e.g., aesthetic attributes, clothing features) from the user's captured inventory of clothing. The inventory recommender 264 and the trend analyzer 268 may reside together or separately in one or more other systems (e.g., of one or more celebrities, fashion designers, consultants and/or retailers to offer/provide recommendations to users). The inventory recommender 264 may further include a recommendation generator 270 that may analyze the outputs of the inventory analyzer 266 and the trend analyzer 268 to determine clothing within the user's inventory and suggested clothing the user may consider acquiring (e.g., sharing, renting or purchasing) for anticipated user activities and/or events. The inventory recommender 264 may also include a recommendation communicator 272 that notifies (e.g., via the speaker 244, email, social media and/or other communications methods available by way of the network) the user regarding one or more recommendations, and may engage the user in a dialogue (e.g., via the speaker 244, microphone 242, email, social media and/or other communications methods) to refine one or more recommendations based on the user's feedback.

Turning now to FIG. 3, an inventory capture database 300 is shown according to an embodiment. An inventory capture system such as, for example, the inventory capture system 102 (FIG. 1) and/or the inventory capture system 200 (FIG. 2), may generally construct records in the database 300 that include various attributes (e.g., aesthetic attributes) of the clothing captured by the inventory capture system. The inventory capture system may update the various attributes (e.g., aesthetic attribute) of the clothing from time to time based on developments in clothing and/or trends identified by the inventory capture system. For example, the clothing attributes (e.g., aesthetic attribute) may include one or more categories for each items of clothing, a title for the clothing, the material composition of the clothing, pattern, size and size type. The clothing attributes may also include an indicator related to desire (e.g., a desire indicator) such as whether the user owns, wants to own, likes but a friend or colleague owns, dislikes and/or never desires to own, and willing to trade and/rent an item of clothing. The clothing attributes may also include a user's color preferences for the item, the fit (e.g., too tight, prefer a more relaxed look) the brand of the clothing, an image and/or recording of the clothing (e.g., visual spectrum, infrared and ultraviolet spectrum recording), a preference annotation (e.g., text, audio and/or visual recording) provided by the user further detailing aspects of the clothing. The clothing attributes may further include addition description details such as the smell of the material or fabric (e.g., the smell of cotton or leather, or scented perfume). The inventory records may be searched by any number of attributes (e.g., aesthetic attribute) to facilitate detailed analysis of one or more clothing inventories of various users. In addition, the inventory database 300 may be anonymized and provided to retailers for trend analysis and forecasting customer demands.

Figure 4:
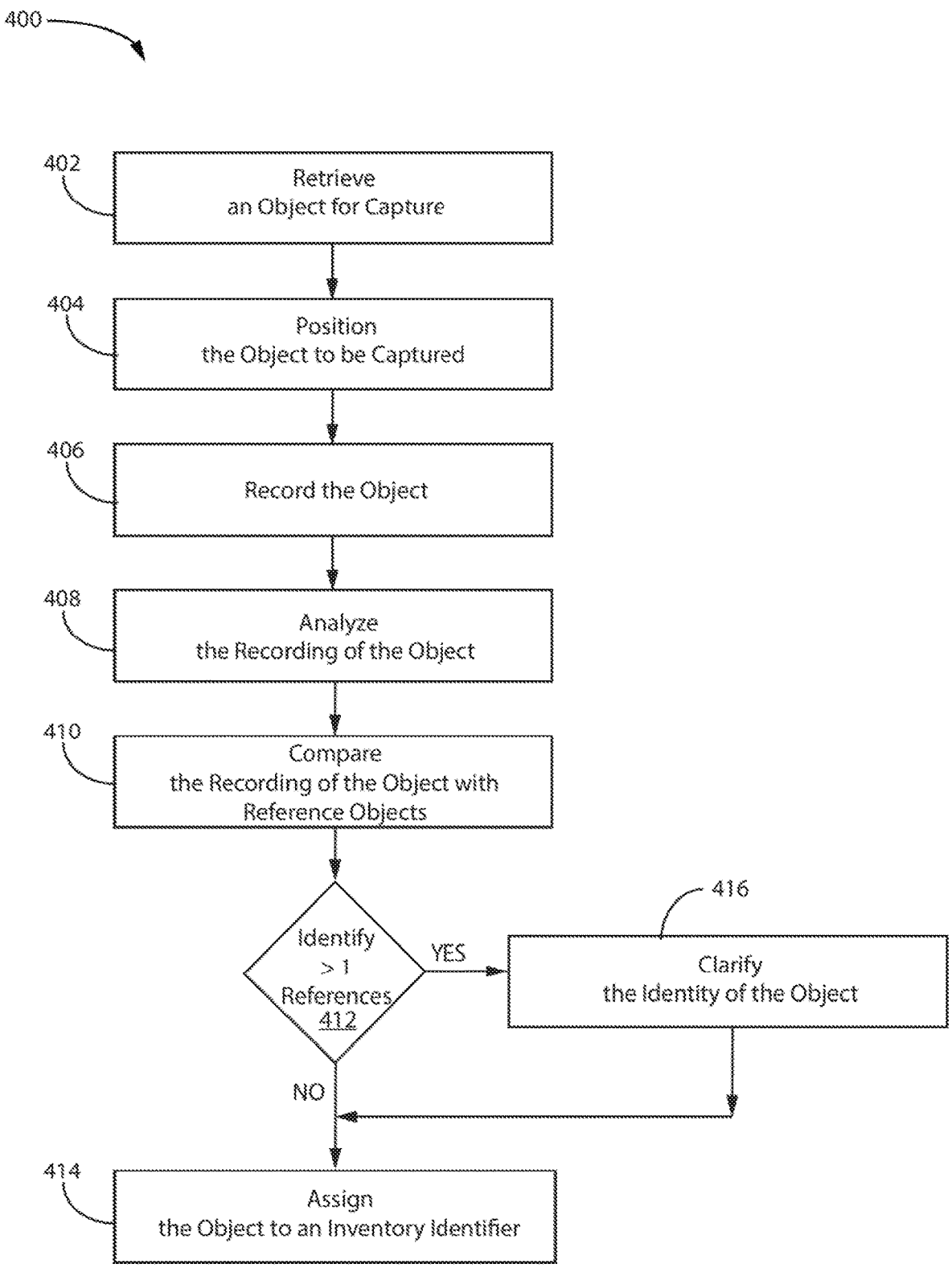
FIG. 4 is a flowchart of an example of a method of constructing an inventory capture database according to an embodiment.

Turning now to FIG. 4, flowchart 400 illustrates an example of a method of constructing an inventory capture database according to an embodiment. The method 400 may generally be implemented in an inventory capture system such as, for example, the inventory capture system 102 (FIG. 1) and/or the inventory capture system 200 (FIG. 2), already discussed. More particularly, the method 400 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 400 may be written in any combination of one or more programming languages, including an object oriented programming language such as C++ or the like and conventional procedural programming languages, such as the "C" programming language or similar programming languages.

Illustrated processing block 402 provides for retrieving an item of clothing from the user's clothes closet 106 (e.g., wardrobe). As already noted, an inventory capture system such as, for example, the inventory capture system 102 (FIG. 1) and/or the inventory capture system 200 (FIG. 2) may be implemented in an autonomous device (e.g., a robotic device) that performs the inventory capture by navigating through the user's wardrobe and capturing each item of clothing. Illustrated processing block 404 provides for positioning the item of clothing so that the inventory capture system 102 may capture the item of clothing with multiple images (e.g., images recording 360° views and/or front and back images of the clothing). Illustrated processing block 406 provides for recording the item of clothing, which may be performed using a stereoscopic device (e.g., camera) with two or more lenses with one or more sensors that simulate human binocular vision and provide the ability to capture three-dimensional images.

Illustrated processing block 408 provides for analyzing the recording of each item of clothing to determine one or more attributes (e.g., aesthetic attribute) of the item of clothing. Block 410 may provide for comparing the recording with one or more reference objects (e.g., representing known fashion-related reference items). Illustrated processing block 412 provides for identifying the recording based on the comparison results from block 408 and the analysis results from block 410. When the processing block 412 identifies one of multiple reference objects that match the item of clothing, processing block 414 receives the identification of the recording from processing block 412, and assigns the clothing item an inventory identifier value to create and/or update a user's clothing inventory record(s) in an inventory database. When the processing block 412 identifies more than one of multiple reference objects that match the item of clothing, processing block 416 provides for clarifying the identity of the item of clothing 104 (as illuminated in FIG. 5).

Figure 5:
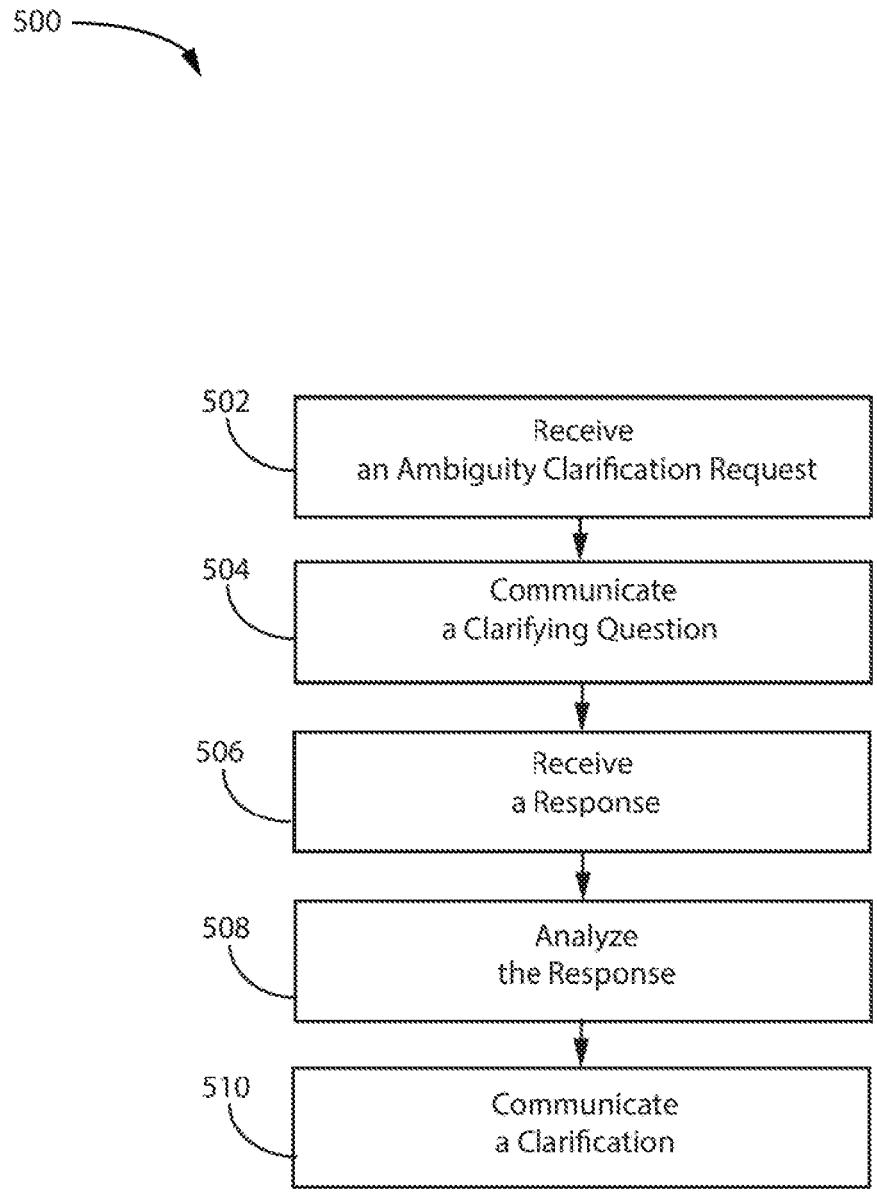
FIG. 5 is a flowchart of an example of a method of clarifying an ambiguity according to an embodiment.

Turning now to FIG. 5, flowchart 500 illustrates an example of a method of clarifying an ambiguity according to an embodiment. The method 500 may generally be substituted for block 416 (FIG. 4), already discussed. Moreover, the method 500 may be implemented as a set of logic instructions and/or firmware stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 provides for receiving an ambiguity clarification request to clarify the identity of an item of clothing, when the processing block 412 (FIG. 4) identifies more than one of multiple reference objects that match the item of clothing. Illustrated processing block 504 provides for constructing (e.g., using natural language processing) and communicating via, for example, a speaker such as the speaker 244 (FIG. 2) a clarifying question based on the multiple reference objects. Using natural-language processing (NLP) allows for a "conversation-style" interaction with the user. Illustrated processing block 506 provides for receiving via, for example, a microphone such as the microphone 242 (FIG. 2) a clarifying question response that illustrated processing block 508 may analyze to determine whether the clarifying question response clarifies the identity of the clothing. Illustrated processing block 510 provides for communicating the clarification to the illustrated processing block 410 (FIG. 4) that may provide for comparing the recording of the clothing with one or more reference objects based on the clarification.

Figure 6:
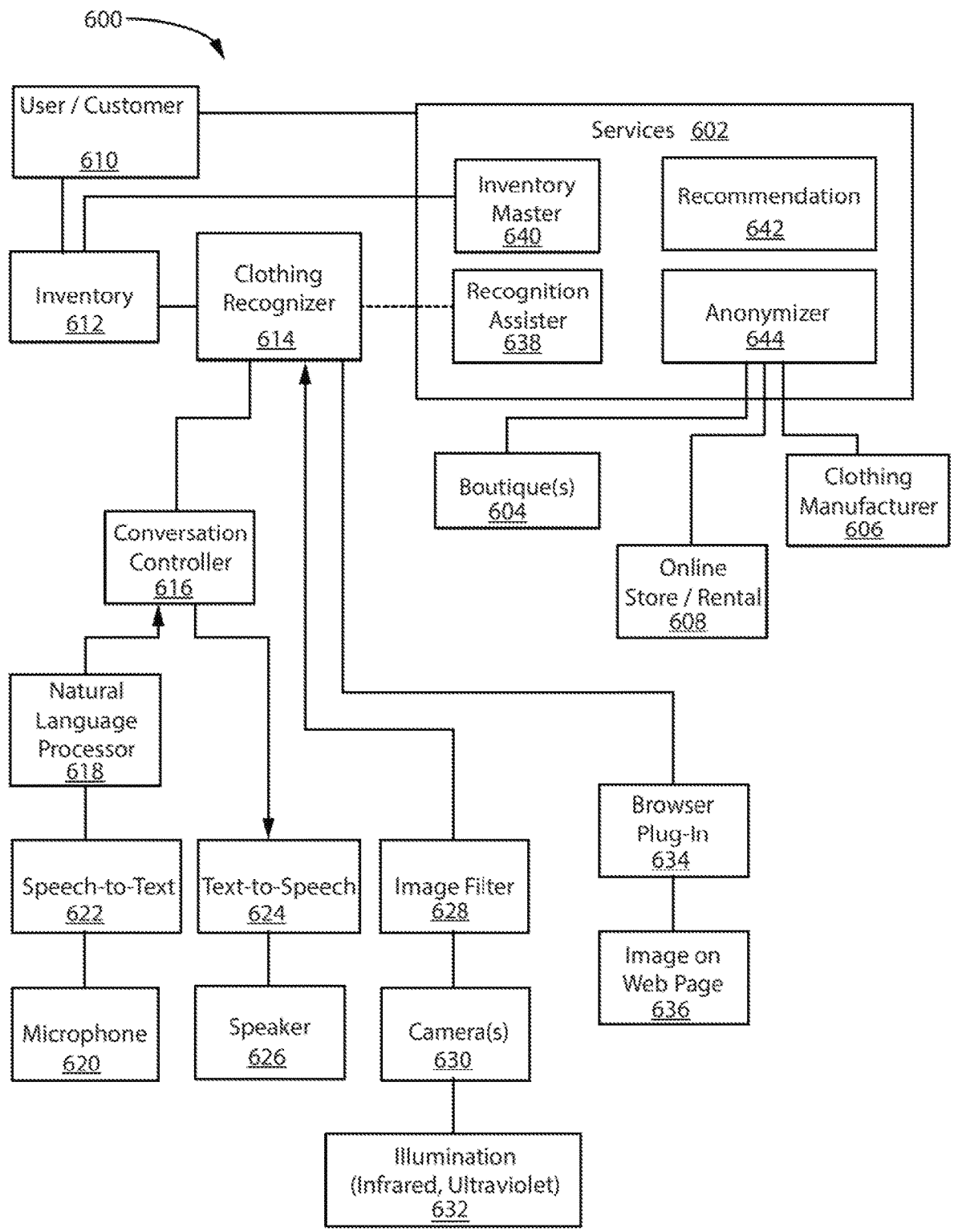
FIG. 6 is a block diagram of an example of a service delivery model according to an embodiment.

FIG. 6 illustrates a block diagram 600 of an example of a model in which services 602 are delivered according to an embodiment. In the illustrated example, boutiques 604, clothing manufacturers 606, physical and online stores and rental clothing companies 608 may also be customers and users of the inventory capture system such as, for example, the inventory capture system 102 (FIG. 1) and/or the inventory capture system 200 (FIG. 2). For example, retailers and rental clothing companies may lend and/or rent the inventory capture system to a customer 610 and/or have the customer 610 install the inventory capture application (e.g., logic) on the customer's device (e.g., mobile phone, tablet, computer, digital camera, not shown) to perform the inventory capture. The customer 610 may visit online and/or in a physical store of the retailer, where the retailer may lend the inventory capture device and/or the customer 610 downloads/installs the application on the customer's device (e.g., mobile phone, tablet, computer, digital camera) to perform the inventory. The customer 610 may conduct the inventory capture and the inventory capture system may deliver the captured inventory 612 to the retailer (e.g., to a retailer's customer clothing inventory database). The customer 610 may include an indication that a clothing item is preferred or disliked, and/or a desire for similar items with variations (e.g., material composition, fabric, pattern, color, shape, texture, smell).

By having a more complete inventory, the boutiques 604, clothing manufacturers 606, physical and online stores and rental clothing companies 608 may make recommendations that better complement the user's existing wardrobe, better match the user's future desires, and avoid offering products the customer 610 already has or worn by close friends and colleagues (e.g., avoid the faux pas of wearing the same clothing as a friend to the same event). With the inventory detail of the customer, the retailer may forecast requirements (e.g., for the retailer and/or the customer) including inventory space, money/financing, fashion trends and designers to contract with, and other resources in order to more efficiently deliver clothing to customers 610 in a timely fashion in order to satisfy the customer's 610 needs and desires.

The inventory capture system database may be used by subscribers (e.g., retailers) who desire to identify customers 610 with previously captured inventory 612 and/or to lend or rent the inventory capture system 102 to customers 610 to capture the customer's inventory 612 of clothing. For example, when a customer 610 visits a retailer online or in-person and indicates that the customer 610 has a searchable/accessible captured inventory 612 of clothing (e.g., the customer may present a member identity number or scannable card that includes a bar code and/or near field communications/NFC chip enabled), the retailer may then access the captured inventory 612 to make tailored recommendations to the customer 610. If the customer 610 does not have a captured inventory 612, the retailer may provide the customer 610 with the inventory capture device to capture the customer's inventory of clothing 612.

The inventory capture system may include a clothing recognizer 614 (e.g., recognition engine) used to capture the inventory of clothing 612 for the customer 610. The clothing recognizer 614 use a conversation controller 616 (e.g., conversation engine) to communicate with the customer 610 in a natural dialogue to capture details about the inventory of clothing 612. The conversation controller 616 may use a natural language processor 618 to communicate with the customer 610 by processing audio received through a microphone 620 using a speech-to-text subsystem 622. The conversation controller 616 may also use a text-to-speech subsystem 624 to communicate through a speaker 626 with the customer 610 to prompt the customer 610 with instructions and/or questions to assist in describing the details about the clothing items captured.

The clothing recognizer 614 may include one or more image filters 628 (e.g., optical, infrared, and/or ultraviolet filters/detectors) to record different aspects of the clothing with a camera or multiple cameras 630 using various illumination components and/or subsystems 632 (e.g., optical, infrared and/or ultraviolet illuminators/emitters). The clothing recognizer 614 may also include a browser plug-in 634 that the customer 610 may install on a mobile device and/or a computer to view and select images presented on a web page 636 to assist the customer 610 in clarifying ambiguities, viewing, annotating and/or maintaining the customer's inventory of clothing 612, and/or indicating desired clothing for purchase and/or rent. The clothing recognizer 614 may communicate with a recognition assister 638 (e.g., assist engine) and send details (e.g., extracted camera image and/or other recorded details) for additional real time analysis and reply/response. The captured inventory of clothing 612 may be merged, stored and/or updated in an inventory master 640 database used by a recommendation engine 642 to analyze and identify trends and recommendations.

Customers 610 may also elect to have purchases of clothing communicated to the inventory capture system (e.g., a clothing inventory database of the inventory capture system) accessible by multiple retailers in order to create and/or update the customer's inventory of clothing 612 so that when the customer 610 engages with a retailer, the retailer may leverage the information identified in the clothing inventory database. A more complete inventory capture facilitates "sharing" of clothing or accessories, such that the user may flag a particular item as being available for sharing (e.g., rent the user's clothing to others). Accordingly, the illustrated model makes determining whether an item of clothing is what another person would want to borrow or rent easier. The customer 610 may select what data is shared (e.g., anonymized) with vendors and what level of anonymization is may be performed by an anonymizer 644 to share the captured inventory 612 of the user 610.

Figure 7:
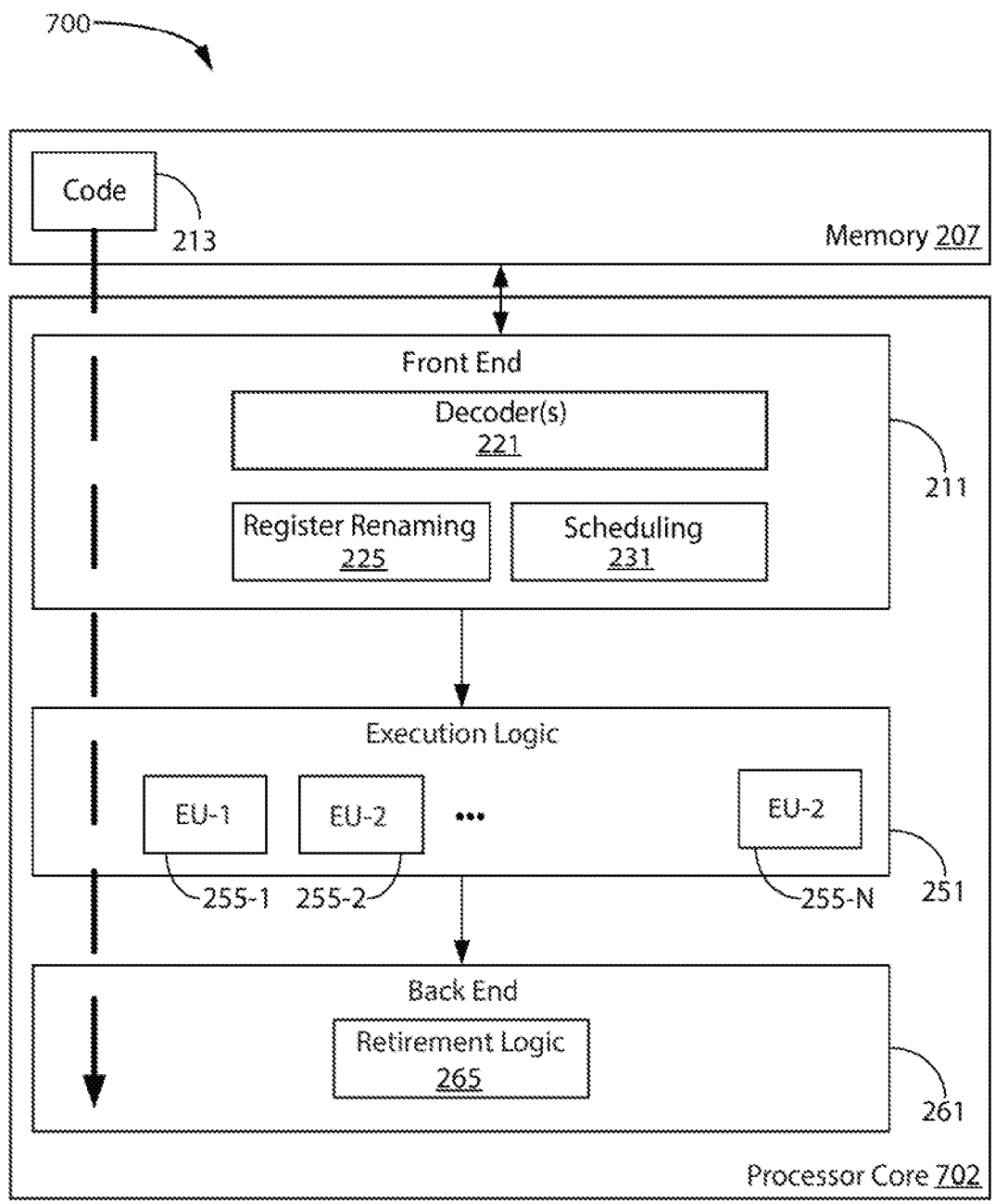
FIG. 7 is a block diagram of an example of a processor according to an embodiment.

FIG. 7 illustrates a block diagram 700 of an example of a processor core 702 according to one embodiment. The processor core 702 may be readily substituted for one or more of the cores 208, 210 (FIG. 2), already discussed, for any type of processor, such as a micro-processor, an embedded processor, a digital signal processor (DSP), a network processor, or other device to execute code. Although only one processor core 702 is illustrated in FIG. 7, a processing element may alternatively include more than one of the processor core 702 illustrated in FIG. 7. The processor core 702 may be a single-threaded core or, for at least one embodiment, the processor core 702 may be multithreaded in that it may include more than one hardware thread context (or "logical processor") per core.

FIG. 7 also illustrates the memory 207 coupled to the processor core 702. The memory 207 may be any of a wide variety of memories (including various layers of memory hierarchy) as are known or otherwise available to those of skill in the art. The memory 207 may include one or more code 213 instruction(s) to be executed by the processor core 702, wherein the code 213 may implement the method 400 (FIG. 4) and/or the method 500 (FIG. 5), already discussed. The processor core 702 follows a program sequence of instructions indicated by the code 213. Each instruction may enter a front end portion 211 and be processed by one or more decoders 221. The decoder 221 may generate as its output a micro operation such as a fixed width micro operation in a predefined format, or may generate other instructions, microinstructions, or control signals which reflect the original code instruction. The illustrated front end 211 also includes register renaming logic 225 and scheduling logic 231, which generally allocate resources and queue the operation corresponding to the convert instruction for execution.

The processor core 702 is shown including execution logic 251 having a set of execution units 255-1 through 255-N. Some embodiments may include a number of execution units dedicated to specific functions or sets of functions. Other embodiments may include only one execution unit or one execution unit that can perform a particular function. The illustrated execution logic 251 performs the operations specified by code instructions.

After completion of execution of the operations specified by the code instructions 213, back end logic 261 retires the instructions of the code 213. In one embodiment, the processor core 702 allows out of order execution but requires in order retirement of instructions. Retirement logic 265 may take a variety of forms as known to those of skill in the art (e.g., re-order buffers or the like). In this manner, the processor core 702 is transformed during execution of the code 213, at least in terms of the output generated by the decoder, the hardware registers and tables utilized by the register renaming logic 225, and any registers (not shown) modified by the execution logic 251.

Although not illustrated in FIG. 7, a processing element may include other elements on chip with the processor core 702. For example, a processing element may include memory control logic along with the processor core 702. The processing element may include I/O control logic and/or may include I/O control logic integrated with memory control logic. The processing element may also include one or more caches.

ADDITIONAL NOTES AND EXAMPLES

Example 1 may include an object recognizer apparatus comprising an analyzer to determine one or more aesthetic attributes of a fashion related item based on a recording of the fashion related item, a comparator to conduct a comparison between the one or more aesthetic attributes and one or more reference objects, an assignor to update a user inventory based on the comparison, and an object ambiguity clarifier including, an ambiguity receiver to receive an ambiguity clarification request for the recording, an ambiguity notifier to communicate a clarifying question based on at least two reference objects, a clarification receiver to receive a response to the clarifying question, a clarification analyzer to conduct an analysis of the response, and a clarification communicator to further identify the recording as one of the at least two reference objects based on the clarification analysis.

Example 2 may include the object recognizer apparatus of Example 1, wherein the one or more reference objects include articles of clothing, and wherein the one or more aesthetic attributes include one or more of a color, a pattern, a shape or a weave tightness.

Example 3 may include the object recognizer apparatus of Example 1 to Example 2, further comprising an annotator to receive an annotation for the recording to identify other aesthetic attributes of the fashion related item, wherein the assignor is to further update the user inventory based on the annotation.

Example 4 may include the object recognizer apparatus of Example 1 to Example 2, wherein the recording is to include one or more of visible spectrum data, infrared (IR) spectrum data or ultraviolet (UV) spectrum data, and wherein the recording is to be associated with one or more of a monoscopic capture event, a stereoscopic capture event or a multiscopic capture event.

Example 5 may include an object recognizer apparatus comprising an analyzer to determine one or more aesthetic attributes of a fashion related item based on a recording of the fashion related item, a comparator to conduct a comparison between the one or more aesthetic attributes and one or more reference objects, and an assignor to update a user inventory based on the comparison.

Example 6 may include the object recognizer apparatus of Example 5, wherein the one or more reference objects include articles of clothing.

Example 7 may include the object recognizer apparatus of Example 5, wherein the object recognizer apparatus further includes an object ambiguity clarifier including, an ambiguity receiver to receive an ambiguity clarification request for the recording, an ambiguity notifier to communicate a clarifying question based on at least two reference objects, a clarification receiver to receive a response to the clarifying question, a clarification analyzer to conduct an analysis of the response, and a clarification communicator to further identify the recording as one of the at least two reference objects based on the clarification analysis.

Example 8 may include the object recognizer apparatus of Example 5, further comprising an annotator to receive an annotation for the recording to identify other aesthetic attributes of the fashion related item, wherein the assignor is to further update the user inventory based on the annotation.

Example 9 may include the object recognizer apparatus of Example 5, wherein the one or more aesthetic attributes include one or more of a color, a pattern, a shape or a weave tightness.

Example 10 may include the object recognizer apparatus of Example 5 to Example 9, wherein the recording is to include visible spectrum data, and wherein the recording is to be associated with one or more of a monoscopic capture event, a stereoscopic capture event or a multiscopic capture event.

Example 11 may include the object recognizer apparatus of Example 5 to Example 9, wherein the recording is to include one or more of infrared (IR) spectrum data and ultraviolet (UV) spectrum data.

Example 12 may include a method comprising determining one or more aesthetic attributes of a fashion related item based on a recording of the fashion related item, conducting a comparison between the one or more aesthetic attributes and one or more reference objects, and updating a user inventory based on the comparison.

Example 13 may include the method of Example 12, wherein the one or more reference objects include articles of clothing.

Example 14 may include the method of Example 12, further comprising receiving an ambiguity clarification request for the recording, communicating a clarifying question based on at least two reference objects, receiving a response to the clarifying question, conducting an analysis of the response, and communicating a clarification to further identify the recording as one of the at least two reference objects based on the clarification analysis.

Example 15 may include the method of Example 12, further comprising receiving an annotation for the recording to identify other aesthetic attributes of the fashion related item, and updating the user inventory further based on the annotation.

Example 16 may include the method of Example 12, wherein the one or more aesthetic attributes include one or more of a color, a pattern, a shape or a weave tightness.

Example 17 may include the method of Example 12 to Example 16, wherein the recording is to include visible spectrum data, and wherein the recording is to be associated with one or more of a monoscopic capture event, a stereoscopic capture event or a multiscopic capture event.

Example 18 may include the method of Example 12 to Example 16, wherein the recording is to include one or more of infrared (IR) spectrum data and ultraviolet (UV) spectrum data.

Example 19 may include at least one computer readable storage medium comprising a set of instructions, which when executed by an object recognizer apparatus, cause the object recognizer apparatus to determine one or more aesthetic attributes of a fashion related item based on a recording of the fashion related item, conduct a comparison between the one or more aesthetic attributes and one or more reference objects, and update a user inventory based on the comparison.

Example 20 may include the at least one computer readable storage medium of Example 19, wherein the one or more reference objects include articles of clothing.

Example 21 may include the at least one computer readable storage medium of Example 19, wherein the set of instructions, when executed by the object recognizer apparatus, further cause the object recognizer apparatus to receive an ambiguity clarification request for the recording, communicate a clarifying question based on at least two reference objects, receive a response to the clarifying question, conduct an analysis of the response, and communicate a clarification to further identify the recording as one of the at least two reference objects based on the clarification analysis.

Example 22 may include the at least one computer readable storage medium of Example 19, wherein the set of instructions, when executed by the object recognizer apparatus, further cause the object recognizer apparatus to receive an annotation for the recording to identify other aesthetic attributes of the fashion related item, and update the user inventory further based on the annotation.

Example 23 may include the at least one computer readable storage medium of Example 19, wherein the one or more aesthetic attributes include one or more of a color, a pattern, a shape or a weave tightness.

Example 24 may include the at least one computer readable storage medium of Example 19 to Example 23, wherein the recording is to include visible spectrum data, and wherein the recording is to be associated with one or more of a monoscopic capture event, a stereoscopic capture event or a multiscopic capture event.

Example 25 may include the at least one computer readable storage medium of Example 19 to Example 23, wherein the recording is to include one or more of infrared (IR) spectrum data and ultraviolet (UV) spectrum data.

Example 26 may include an object recognizer apparatus comprising means for determining one or more aesthetic attributes of a fashion related item based on a recording of the fashion related item, means for conducting a comparison between the one or more aesthetic attributes and one or more reference objects, and means for updating a user inventory based on the comparison.

Example 27 may include the object recognizer apparatus of Example 26, wherein the one or more reference objects is to include articles of clothing, and wherein the one or more aesthetic attributes is to include one or more of a color, a pattern, a shape or a weave tightness.

Example 28 may include the object recognizer apparatus of Example 26, further comprising means for receiving an ambiguity clarification request for the recording, means for communicating a clarifying question based on at least two reference objects, means for receiving a response to the clarifying question, means for conducting an analysis of the response, and means for communicating a clarification to further identify the recording as one of the at least two reference objects based on the clarification analysis.

Example 29 may include the object recognizer apparatus of Example 26 to Example 28, further comprising means for receiving an annotation for the recording to identify other aesthetic attributes of the fashion related item, and means for updating the user inventory further based on the annotation.

Example 30 may include the object recognizer apparatus of Example 26 to Example 28, wherein the recording is to include visible spectrum data, and wherein the recording is to be associated with one or more of a monoscopic capture event, a stereoscopic capture event or a multiscopic capture event.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, the manufactured of devices of smaller size is expected. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth", "and so on", or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one storage device comprising computer readable instructions that, when executed, cause at least one processor to at least:
   create an inventory of fashion-related items based on one or more images or recordings of the fashion-related items, at least some of the one or more images or recordings of the fashion-related items from a depth sensing camera, at least some of the fashion-related items from a user's wardrobe;
   cause one or more annotations to be stored in association with one or more of the fashion-related items;
   analyze a first image or a first recording of a first fashion-related item to determine a first attribute of the first fashion-related item;
   analyze a second image or a second recording of a second fashion-related item to determine a second attribute of the second fashion-related item;
   cause the first attribute to be stored in association with the first fashion-related item in the inventory of fashion-related items;
   cause the second attribute to be stored in association with the second fashion-related item in the inventory of fashion-related items;
   identify the first fashion-related item for an occasion based on the first attribute;
   identify the second fashion-related item for a season based on the second attribute;
   identify a third fashion-related item not in the inventory; and
   recommend the third fashion-related item be purchased.

2. The at least one storage device of claim 1, wherein the recommendation is based on a trend in fashion-related items.

3. The at least one storage device of claim 1, wherein the inventory is accessible to at least one retailer.

4. The at least one storage device of claim 3, wherein the instructions, when executed, further cause the at least one processor to automatically update the inventory based on a purchase of the third fashion-related item.

5. The at least one storage device of claim 1, wherein the recommendation is based on a future event associated with the user.

6. An inventory system comprising:
   a network interface;
   at least one storage device;
   at least one processor to execute instructions to cause the at least one processor to:
      create an inventory of fashion-related items based on one or more images or recordings of the fashion-related items, the one or more images or recordings to be obtained via the network interface, at least some of the one or more images or recordings of the fashion-related items from a depth sensing camera, at least some of the fashion-related items from a user's wardrobe;
cause one or more annotations to be stored in association with one or more of the fashion-related items;
analyze a first one of the one or more images or recordings of a first fashion- related item to determine a first attribute of the first fashion-related item;
analyze a second one of the one or more images or recordings of a second fashion-related item to determine a second attribute of the second fashion-related item;
cause the first attribute and the second attribute to be stored in association with the first fashion-related item and the second fashion-related item, respectively, in the inventory of fashion-related items;
identify the first fashion-related item for an occasion based on the first attribute;
identify the second fashion-related item for a season based on the second attribute;
identify a third fashion-related item not in the inventory; and
recommend that the third fashion-related item be purchased.

7. The at least one storage device of claim 6, wherein the recommendation is based on a trend in fashion-related items.

8. The at least one storage device of claim 6, wherein the inventory is accessible to at least one retailer.

9. The at least one storage device of claim 8, wherein the at least one processor is to automatically update the inventory based on a purchase of the third fashion-related item.

10. The at least one storage device of claim 6, wherein the recommendation is based on a future event associated with the user.

11. An electronic device comprising:
a depth sensing camera;
a user input device to receive user input;
at least one output device to supply output to a user;
at least one storage device; and
at least one processor to:
cause the depth sensing camera to capture at least one image or recording of a first fashion-related item of a wardrobe of the user;
receive, via the user input device, a first description of the first fashion-related item and a second description of a second fashion-related item;
cause the first description to be stored as a first annotation in association with a first image or first recording of the first fashion-related item;
cause the second description to be stored as a second annotation in association with a second image or second recording of the second fashion-related item;
cause a first notification to be communicated via the at least one output device, the first notification to indicate that the first fashion-related item is appropriate for an occasion, the first notification based on a first attribute of the first fashion-related item, the first attribute based on a first analysis of the first image or first recording of the first fashion- related item;
cause a second notification to be communicated via the at least one output device, the second notification to indicate that the second fashion-related item is appropriate for a season, the second notification based on a second attribute of the second fashion-related item, the second attribute based on a second analysis of the second image or second recording of the second fashion-related item; and
cause a recommendation to purchase a third fashion-related item to be communicated via the at least one output device.

12. The electronic device of claim 11, wherein the recommendation is based on a trend in fashion-related items.

13. The electronic device of claim 11, wherein an inventory including the first annotation and the second annotation is to be accessible to at least one retailer.

14. The electronic device of claim 13, wherein the at least one processor is to cause the inventory to be updated based on a purchase of the third fashion-related item.

15. The electronic device of claim 11, wherein the recommendation is based on a future event associated with the user.

16. The electronic device of claim 11, wherein the user input device is a microphone and the at least one image or recording is to be captured responsive to one or more voice commands from the microphone.

17. The electronic device of claim 11, wherein the at least one output device is at least one of a display or a speaker.

18. At least one storage device comprising computer readable instructions that, when executed, cause at least one processor to:
cause a depth sensing camera to capture an image or recording of one or more fashion-related items of a user's wardrobe;
cause a first description of a first fashion-related item to be obtained;
cause a second description of a second fashion-related item to be obtained;
cause the first description to be stored as a first annotation in association with a first image or a first recording of the first fashion-related item;
cause the second description to be stored as a second annotation in association with a second image or a second recording of the second fashion-related item;
cause a first notification to be communicated to at least one output device, the first notification to indicate that the first fashion-related item is appropriate for an occasion, the first notification based on a first attribute of the first fashion-related item, the first attribute based on a first analysis of the first image or the first recording of the first fashion-related item;
cause a second notification to be communicated to the at least one output device, the second notification to indicate that the second fashion-related item is appropriate for a season, the second notification based on a second attribute of the second fashion-related item, the second attribute based on a second analysis of the second image or the second recording of the second fashion-related item; and
cause a recommendation to purchase a third fashion-related item to be communicated to the at least one output device.

19. The at least one storage device of claim 18, wherein the recommendation is based on a trend in fashion-related items.

20. The at least one storage device of claim 18, wherein an inventory including the first annotation and the second annotation is to be accessible to at least one retailer.

21. The at least one storage device of claim 20, wherein the instructions, when executed, further cause the at least one processor to cause the inventory to be updated based on a purchase of the third fashion-related item.

22. The at least one storage device of claim 18, wherein the recommendation is based on a future event associated with the user.

23. The at least one storage device of claim 18, wherein the at least one image or recording of one or more fashion-related items is captured responsive to one or more voice commands.

* * * * *